US012698999B2

(12) United States Patent
Li et al.

(10) Patent No.: US 12,698,999 B2
(45) Date of Patent: Aug. 4, 2026

(54) ELECTROMAGNETIC FLOWMETER CALIBRATION METHOD AND DEVICE

(71) Applicants:Shanghai Institute of Measurement And Testing Technology, Shanghai (CN); Shanghai Compulsory Verification Center for Watermeters Co.."Ltd., Shanghai (CN)

(72) Inventors: Xuejing Li, Shanghai (CN); Jinchao Bai, Shanghai (CN); Xinhong Yao, Shanghai (CN)

(73) Assignees: Shanghai Institute of Measurement And Testing Technology, Shanghai (CN); Shanghai Compulsory Verification Center for Watermeters Co.."Ltd., Shanghai (CN)

( * ) Notice: Subject to any disclaimer, the term of this patent is extended or adjusted under 35 U.S.C. 154(b) by 310 days.

(21) Appl. No.: 18/666,439

(22) Filed: May 16, 2024

(65) Prior Publication Data

US 2025/0116545 A1 Apr. 10, 2025

(30) Foreign Application Priority Data

Oct. 10, 2023 (CN) .......................... 202311308661.6

(51) Int. Cl.
 G01F 25/10 (2022.01)
 G01F 1/58 (2006.01)
 G01F 1/60 (2006.01)
(52) U.S. Cl.
 CPC .............. G01F 25/10 (2022.01); G01F 1/584 (2013.01); G01F 1/60 (2013.01)

(58) Field of Classification Search
 CPC . G01F 25/10; G01F 1/584; G01F 1/60; G01F 1/58
 See application file for complete search history.

(56) References Cited

U.S. PATENT DOCUMENTS

| | | | | |
|---|---|---|---|---|
| 5,297,425 | A * | 3/1994 | Hamby | ................. E21B 47/113 73/861.17 |
| 2024/0310200 | A1* | 9/2024 | Dasgupta | ................ G01F 25/10 |

FOREIGN PATENT DOCUMENTS

| | | | | | |
|---|---|---|---|---|---|
| CN | 101387530 | A | * | 3/2009 | ............... G01F 1/60 |
| KR | 102167577 | B1 | * | 10/2020 | ............ G01F 25/10 |
| WO | WO-2023212826 | A1 | * | 11/2023 | ............. G01F 15/02 |

\* cited by examiner

*Primary Examiner* — Francis C Gray

(57) ABSTRACT

Disclosed are an electromagnetic flowmeter calibration method and device, electronic equipment and a storage medium. The method includes the steps of: measuring a flow rate of a fluid using an electromagnetic flowmeter; measuring induced voltages of various section microelements in a section microelement matrix using an electrode array; performing feature extraction on a plurality of microelement induced voltages to obtain an input feature of a fluid flow pattern recognition model, and recognizing a flow pattern of the fluid; and calculating a flow rate of a fluid flowing through a through-flow pipeline, and calibrating a meter coefficient of the electromagnetic flowmeter. In the present disclosure, the electromagnetic flowmeter may be accurately calibrated with low cost and high efficiency.

10 Claims, 4 Drawing Sheets

Measure, in a case that a fluid flows through a through-flow pipeline of an electromagnetic flowmeter, a flow rate of the fluid flowing through the through-flow pipeline using the electromagnetic flowmeter to obtain a measured flow rate — 101

Measure induced voltages of various section microelements in a section microelement matrix of a cross section of the through-flow pipeline using an electrode array arranged around the cross section of the through-flow pipeline to obtain a plurality of microelement induced voltages — 102

Perform feature extraction on the plurality of microelement induced voltages to obtain an input feature of a fluid flow pattern recognition model, and recognize a flow pattern of the fluid using the fluid flow pattern recognition model according to the input feature — 103

Calculate a flow rate of the fluid flowing through the through-flow pipeline according to the flow pattern of the fluid to obtain a standard flow rate, and calibrate a meter coefficient of the electromagnetic flowmeter according to the standard flow rate and the measured flow rate — 104

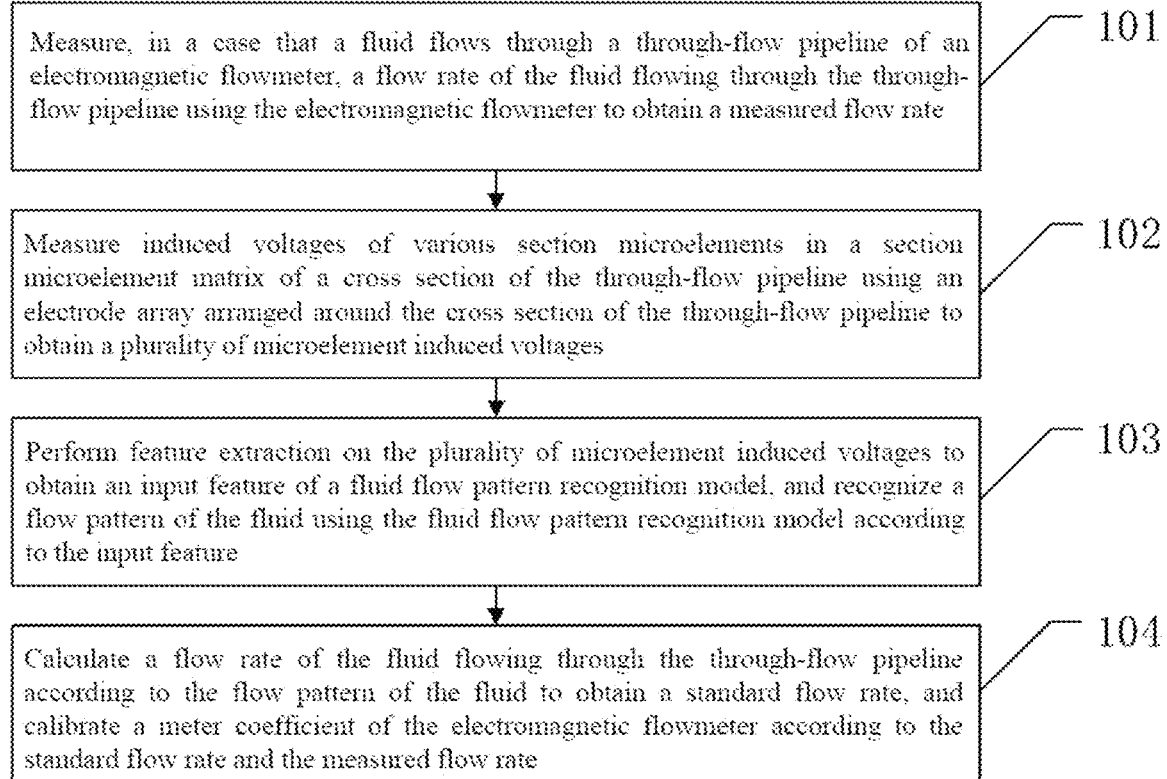

Measure, in a case that a fluid flows through a through-flow pipeline of an electromagnetic flowmeter, a flow rate of the fluid flowing through the through-flow pipeline using the electromagnetic flowmeter to obtain a measured flow rate

101

Measure induced voltages of various section microelements in a section microelement matrix of a cross section of the through-flow pipeline using an electrode array arranged around the cross section of the through-flow pipeline to obtain a plurality of microelement induced voltages

102

Perform feature extraction on the plurality of microelement induced voltages to obtain an input feature of a fluid flow pattern recognition model, and recognize a flow pattern of the fluid using the fluid flow pattern recognition model according to the input feature

103

Calculate a flow rate of the fluid flowing through the through-flow pipeline according to the flow pattern of the fluid to obtain a standard flow rate, and calibrate a meter coefficient of the electromagnetic flowmeter according to the standard flow rate and the measured flow rate

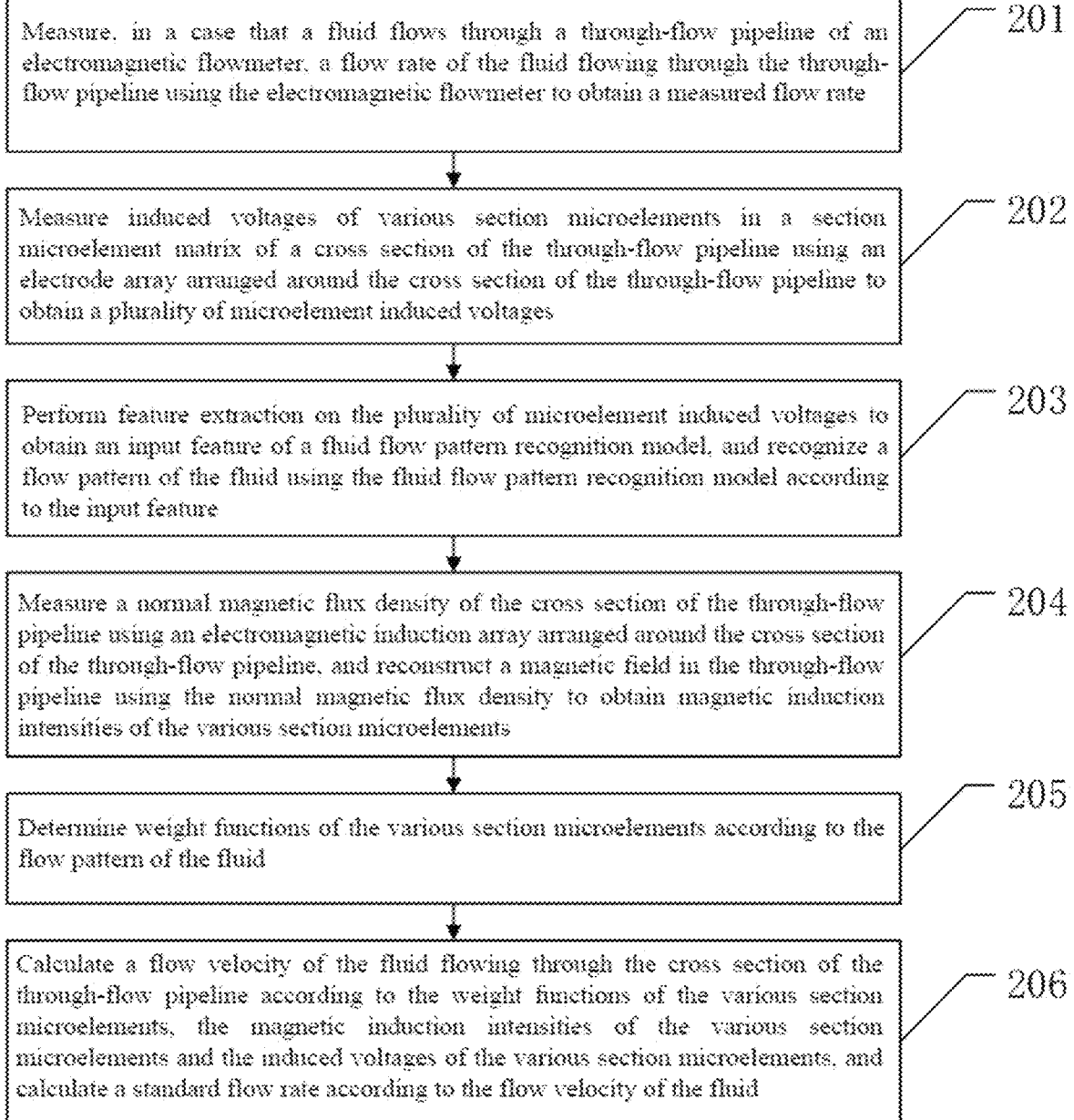

Measure, in a case that a fluid flows through a through-flow pipeline of an electromagnetic flowmeter, a flow rate of the fluid flowing through the through-flow pipeline using the electromagnetic flowmeter to obtain a measured flow rate — 201

Measure induced voltages of various section microelements in a section microelement matrix of a cross section of the through-flow pipeline using an electrode array arranged around the cross section of the through-flow pipeline to obtain a plurality of microelement induced voltages — 202

Perform feature extraction on the plurality of microelement induced voltages to obtain an input feature of a fluid flow pattern recognition model, and recognize a flow pattern of the fluid using the fluid flow pattern recognition model according to the input feature — 203

Measure a normal magnetic flux density of the cross section of the through-flow pipeline using an electromagnetic induction array arranged around the cross section of the through-flow pipeline, and reconstruct a magnetic field in the through-flow pipeline using the normal magnetic flux density to obtain magnetic induction intensities of the various section microelements — 204

Determine weight functions of the various section microelements according to the flow pattern of the fluid — 205

Calculate a flow velocity of the fluid flowing through the cross section of the through-flow pipeline according to the weight functions of the various section microelements, the magnetic induction intensities of the various section microelements and the induced voltages of the various section microelements, and calculate a standard flow rate according to the flow velocity of the fluid — 206

ELECTROMAGNETIC FLOWMETER CALIBRATION METHOD AND DEVICE

CROSS-REFERENCE TO RELATED APPLICATIONS

This application claims priority of Chinese Patent Application No. 202311308661.6, filed on Oct. 10, 2023, the entire contents of which are incorporated herein by reference.

TECHNICAL FIELD

The present disclosure relates to the technical field of electromagnetic flowmeters, and more particularly to an electromagnetic flowmeter calibration method and device.

BACKGROUND

In the prior art, the solution for calibrating an electromagnetic flowmeter includes real flow calibration or dry calibration. The accuracy of dry calibration method is low, which may not achieve the purpose of calibration. The real flow calibration is used to calibrate a flowmeter in an actual flow field with high accuracy. However, for some flowmeters, such as large caliber flowmeters inconvenient to disassemble for municipal drainage as well as energy saving and emission reduction, the use of real flow calibration is costly.

SUMMARY

Examples of the present disclosure provide an electromagnetic flowmeter calibration method and device that may accurately calibrate an electromagnetic flowmeter with low cost and high efficiency.

In a first aspect, an example of the present disclosure provides an electromagnetic flowmeter calibration method, including the steps of: measuring, in a case that a fluid flows through a through-flow pipeline of an electromagnetic flowmeter, a flow rate of the fluid flowing through the through-flow pipeline using the electromagnetic flowmeter to obtain a measured flow rate;

measuring induced voltages of various section microelements in a section microelement matrix of a cross section of the through-flow pipeline using an electrode array arranged around the cross section of the through-flow pipeline to obtain a plurality of microelement induced voltages, the section microelement matrix of the cross section of the through-flow pipeline being composed of a plurality of section microelements obtained by dividing the cross section of the through-flow pipeline;

performing feature extraction on the plurality of microelement induced voltages to obtain an input feature of a fluid flow pattern recognition model, and recognizing a flow pattern of the fluid using the fluid flow pattern recognition model according to the input feature; and calculating a flow rate of the fluid flowing through the through-flow pipeline according to the flow pattern of the fluid to obtain a standard flow rate, and calibrating a meter coefficient of the electromagnetic flowmeter according to the standard flow rate and the measured flow rate.

In a second aspect, an example of the present disclosure provides an electromagnetic flowmeter calibration device, including: a measured flow rate acquisition module, configured to measure, in a case that a fluid flows through a through-flow pipeline of an electromagnetic flowmeter, a flow rate of the fluid flowing through the through-flow pipeline using the electromagnetic flowmeter to obtain a measured flow rate;

a microelement induced voltage acquisition module, configured to measure induced voltages of various section microelements in a section microelement matrix of a cross section of the through-flow pipeline using an electrode array arranged around the cross section of the through-flow pipeline to obtain a plurality of microelement induced voltages, the section microelement matrix of the cross section of the through-flow pipeline being composed of a plurality of section microelements obtained by dividing the cross section of the through-flow pipeline;

a flow pattern recognition module, configured to perform feature extraction on the plurality of microelement induced voltages to obtain an input feature of a fluid flow pattern recognition model, and recognize a flow pattern of the fluid using the fluid flow pattern recognition model according to the input feature; and a calibration module, configured to calculate a flow rate of the fluid flowing through the through-flow pipeline according to the flow pattern of the fluid to obtain a standard flow rate, and calibrate a meter coefficient of the electromagnetic flowmeter according to the standard flow rate and the measured flow rate.

The present disclosure provides an electromagnetic flowmeter calibration method and device. The induced voltages of the various section microelements of the cross section of the through-flow pipeline are measured, and feature extraction is performed on the induced voltages of the various section microelements; further, the extracted features are taken as an input of the fluid flow pattern recognition model, and the fluid flow pattern recognition model is used to accurately recognize the flow pattern of a fluid flowing through the electromagnetic flowmeter; and further, a standard flow rate of the fluid flowing through the electromagnetic flowmeter is accurately calculated according to the flow pattern, and the meter coefficient of the electromagnetic flowmeter is calibrated according to the standard flow rate, thereby accurately calibrating the electromagnetic flowmeter with low cost and high efficiency without disassembling the electromagnetic flowmeter.

BRIEF DESCRIPTION OF THE DRAWINGS

FIG. 1 is a schematic flow chart of an electromagnetic flowmeter calibration method provided by an example of the present disclosure;

FIG. 2 is another schematic flow chart of the electromagnetic flowmeter calibration method provided by an example of the present disclosure;

DETAILED DESCRIPTION

Figure 3:
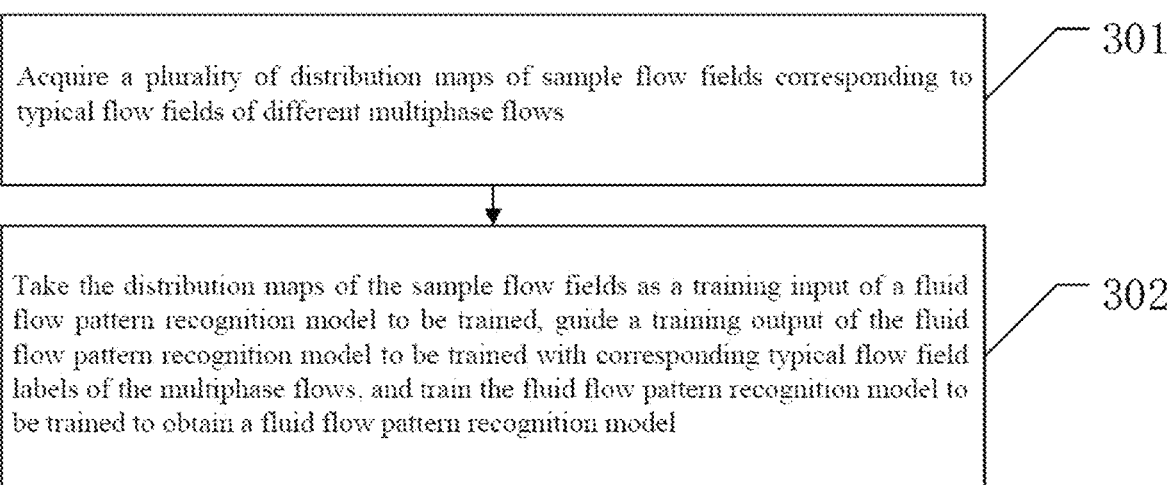
FIG. 3 is yet another schematic flow chart of the electromagnetic flowmeter calibration method provided by an example of the present disclosure.

FIG. 1 is a schematic flow chart of an electromagnetic flowmeter calibration method provided by an example of the present disclosure. The method may be performed by an electromagnetic flowmeter calibration device provided by an example of the present disclosure; and the device may be implemented in software and/or hardware. In a specific example, the device may be integrated in electronic equipment, such as a computer and a server.

Example 1

A device integrated in electronic equipment is taken as an example to explain. Referring to FIG. 1, an electromagnetic flowmeter calibration method may specifically include the following steps.

In step 101, in a case that a fluid flows through a through-flow pipeline of an electromagnetic flowmeter, the electromagnetic flowmeter may generate an excitation magnetic field in a case that excited by an excitation module, and a flow rate of the fluid flowing through the through-flow pipeline is measured to obtain a measured flow rate. This step can facilitate the calibration of meter parameters of the electromagnetic flowmeter according to the measured flow rate and a standard flow rate.

The excitation module may provide two modes of constant current voltage source and alternating current (AC) power supply. The maximum driving current of the excitation module may be 10 mA; and an AC excitation voltage may be 24 V, and a direct current (DC) excitation voltage may be 3.6 V.

In step 102, an electrode array uniformly distributed around a cross section of the through-flow pipeline is used. The electrode array penetrates through a pipeline wall or an inner side of the pipeline wall corresponding to the cross section of the through-flow pipeline, and communicates with the outside via a wire, and a heating device is arranged around the electrode array to reduce the influence of an oil film on an electrode testing process.

Induced voltages of various section microelements in a section microelement matrix of the cross section of the through-flow pipeline are measured to obtain a plurality of microelement induced voltages. The section microelement matrix of the cross section of the through-flow pipeline is composed of a plurality of section microelements obtained by dividing the cross section of the through-flow pipeline. This step can facilitate the feature extraction on the induced voltages of the various section microelements, and further facilitate the use of a fluid flow pattern recognition model to recognize a flow pattern of the fluid. Moreover, in this step, a finite element method is introduced into the calibration of the electromagnetic flowmeter, which may facilitate the combination with an in-depth learning method. In a case that an analytical solution is difficult to obtain, the results may be calculated numerically.

In step 103, feature extraction is performed on the plurality of microelement induced voltages to obtain an input feature of the fluid flow pattern recognition model, and the fluid flow pattern recognition model is used to recognize a flow pattern of the fluid according to the input feature. This step can facilitate the calculation of the standard flow rate of the fluid according to the flow pattern of the fluid, and further facilitate the accurate calibration of the meter parameters of the electromagnetic flowmeter according to the standard flow rate and the measured flow rate measured by the electromagnetic flowmeter in step 101.

A process of the feature extraction is performed on the plurality of microelement induced voltages to obtain an input feature of the fluid flow pattern recognition model includes that: a distribution map of a flow field to be recognized is generated according to the plurality of microelement induced voltages as an input feature of the fluid flow pattern recognition model.

Specifically, in a case that the fluid flows through the cross section of the through-flow pipeline, microelement induced voltages generated by a magnetic field of the electromagnetic flowmeter cut by fluids on the various section microelements may be plotted to generate the distribution map of the flow field as an input of the fluid flow pattern recognition model, and the flow pattern of the fluid may be obtained by using the fluid flow pattern recognition model to recognize the distribution map of the flow field.

Specifically, the fluid flow pattern recognition model may be a model in the prior art or a model trained according to the corresponding relationship between the known fluid flow pattern and the distribution map of the flow field.

Specifically, the fluid flow pattern recognition model may be a multilayer perceptron, or another in-depth learning machine such as a neural network model.

In step 104, a flow rate of the fluid flowing through the through-flow pipeline is calculated according to the flow pattern of the fluid to obtain a standard flow rate, and a meter coefficient of the electromagnetic flowmeter is calibrated according to the standard flow rate and the measured flow rate. This step can accurately calculate a flow rate of a fluid flowing through the electromagnetic flowmeter according to the flow pattern and further calibrate the meter coefficient of the electromagnetic flowmeter according to the standard flow rate on the basis of accurately recognizing a flow pattern of the fluid flowing through the electromagnetic flowmeter using the fluid flow pattern recognition model in combination with steps 101-103, thereby accurately calibrating the electromagnetic flowmeter with low cost and high efficiency without disassembling the electromagnetic flowmeter.

Before the meter coefficient of the electromagnetic flowmeter is calibrated according to the standard flow rate and the measured flow rate, a temperature of the fluid is measured to obtain a fluid temperature. The meter coefficient of the electromagnetic flowmeter is calibrated according to the standard flow rate and the measured flow rate, including that: the meter coefficient of the electromagnetic flowmeter is calibrated according to the standard flow rate, the measured flow rate and the fluid temperature.

Specifically, the temperature of the fluid may be measured by means of a temperature sensor arranged inside the through-flow pipeline. It is also possible to calibrate a meter coefficient according to a temperature of a present day. Since the meter coefficient changes as the temperature changes, adjusting and calibrating the meter coefficient according to the temperature can make a calibration result more accurate.

The temperature of the fluid in the pipeline is (20-30° C.), and the control of the heating device is divided into: starting heating, stop heating, clearly wrapping an oil film outside an electrode before testing, and stop heating during testing.

Example 2

An electromagnetic flowmeter calibration method is provided, a magnetically sensitive tracking indicator being added to a fluid.

The magnetically sensitive tracking indicator is added to the fluid, increasing a conductivity of the fluid, which can facilitate the accurate measurement of a normal magnetic flux density of a cross section of a through-flow pipeline using an electromagnetic induction array, and a field is reconstructed. The magnetically sensitive indicator specifically may be a magnetic conductive material such as iron filings and iron-containing alloys.

The electromagnetic flowmeter calibration method of the example, as shown in FIG. 2, includes the following steps.

In step 201, in a case that a fluid flows through a through-flow pipeline of an electromagnetic flowmeter, a flow rate of the fluid flowing through the through-flow pipeline is measured using the electromagnetic flowmeter to obtain a measured flow rate.

In step 202, induced voltages of various section microelements in a section microelement matrix of a cross section of the through-flow pipeline are measured using an electrode array arranged around the cross section of the through-flow pipeline to obtain a plurality of microelement induced voltages.

In step 203, feature extraction is performed on the plurality of microelement induced voltages to obtain an input feature of a fluid flow pattern recognition model, and a flow pattern of the fluid is recognized using the fluid flow pattern recognition model according to the input feature.

In step 204, a normal magnetic flux density of the cross section of the through-flow pipeline is measured using an electromagnetic induction array arranged around the cross section of the through-flow pipeline, and a magnetic field in the through-flow pipeline is reconstructed using the normal magnetic flux density to obtain magnetic induction intensities of the various section microelements.

Alternatively, the electromagnetic induction array includes 16 groups of Hall probes uniformly pasted and fixed on an inner wall of a pipeline corresponding to the cross section of the through-flow pipeline, a size of the Hall probe being 1.5 mm*1.5 mm.

In step 205, weight functions of the various section microelements are determined according to the flow pattern of the fluid.

In step 206, a flow velocity of the fluid flowing through the cross section of the through-flow pipeline is calculated according to the weight functions of the various section microelements, the magnetic induction intensities of the various section microelements and the induced voltages of the various section microelements, and a standard flow rate is calculated according to the flow velocity of the fluid.

Specifically, the flow velocity of the fluid flowing through the cross section of the through-flow pipeline may be calculated on the basis of the following formula:

$$U = \sum U(i, j) = \sum W(i, j)v(i, j)B(i, j)$$
$$V = \sum v_{(i,j)}$$

where U represents an induced voltage, U(i,j) represents an induced voltage of any section microelement; W(i,j) represents a weight function of any section microelement; v(i,j) represents a flow velocity of a fluid flowing through any section microelement; B(i,j) represents a magnetic induction intensity of any section microelement; and V represents a flow velocity of a fluid flowing through a cross section of a through-flow pipeline.

In the example of the present disclosure, the magnetic field is reconstructed and the weight functions for the various section microelements are determined on the basis of the flow pattern of the fluid, then the flow velocity of the fluid flowing through the cross section of the through-flow pipeline is calculated according to the relationship between induced potentials of the various section microelements, the weight functions of the various section microelements, the magnetic induction intensities and the flow velocity of the fluid, and further the standard flow rate is calculated, ensuring the accuracy of the standard flow rate, thereby ensuring the accuracy of the meter coefficient of the electromagnetic flowmeter calibrated according to the standard flow rate.

Example 3

According to an electromagnetic flowmeter calibration method, a training method for a fluid flow pattern recognition model includes the following steps as shown in FIG. 3.

In step 301, 10000-30000 distribution maps of sample flow fields corresponding to typical flow fields of different multiphase flows are acquired, including: a bubble flow field, a ring flow field, a turbulent flow field, a slug flow field, a drop flow field, and the like. Half of the distribution maps are used as a training set and the other half as a validation set.

In step 302, the distribution maps of the sample flow fields are taken as a training input of a fluid flow pattern recognition model to be trained, a training output of the fluid flow pattern recognition model to be trained is guided with corresponding typical flow field labels of the multiphase flows, and the fluid flow pattern recognition model to be trained is trained to obtain a fluid flow pattern recognition model.

Specifically, the typical flow field labels of the multiphase flows may be a three-dimensional form field, specifically including: a bubble flow field label 001, a ring flow field label 010, a turbulent flow field label 011, a slug flow field label 100, a drop flow field label 101, and the like.

The fluid flow pattern recognition model may include four layers: one input layer, two hidden layers, and one output layer. The two hidden layers are arranged with 40 and 30 neurons, separately; and a dropout layer is added after each hidden layer, the function of which is to randomly return part of the weight of the hidden layer to zero in a process of model training to reduce the interdependence between nodes, realizing the network regularization and reducing the risk of a network structure. One neuron is set in the output layer and a sigmoid function is selected as an activation function.

In the example of the present disclosure, the fluid flow pattern recognition model to be trained is trained by using typical flow fields of different multiphase flows, which can facilitate the trained fluid flow pattern recognition model to be accurately performed in a case that a flow pattern of the fluid is recognized according to distribution maps of flow fields obtained by the feature extraction of a plurality of microelement induced voltages, thereby finally obtaining a relatively accurate standard flow rate and accurately calibrating a meter coefficient of the electromagnetic flowmeter.

The electromagnetic flowmeter calibration method of the present disclosure further includes that a calibration command input by a calibration person is acquired via a human-computer interaction module, and related information about the calibration of the meter coefficient is displayed via the human-computer interaction module.

The human-computer interaction module may include a liquid crystal display screen and user buttons.

The calibration related information includes fluid flow pattern information, magnetic field information, temperature information, measured flow rate information, standard flow rate information and final calibrated meter coefficient.

The electromagnetic flowmeter calibration method of the present disclosure further includes that the related information about the calibration of the meter coefficient is sent to a lower computer.

A communication module may include an infrared communication module, a meter bus (MBUS) communication module and a recommended standard (RS) 485 communication module. Infrared communication is to meet the requirements of manual wireless reading, and MBUS communication and RS485 may achieve remote reading.

Example 4

Figure 4:
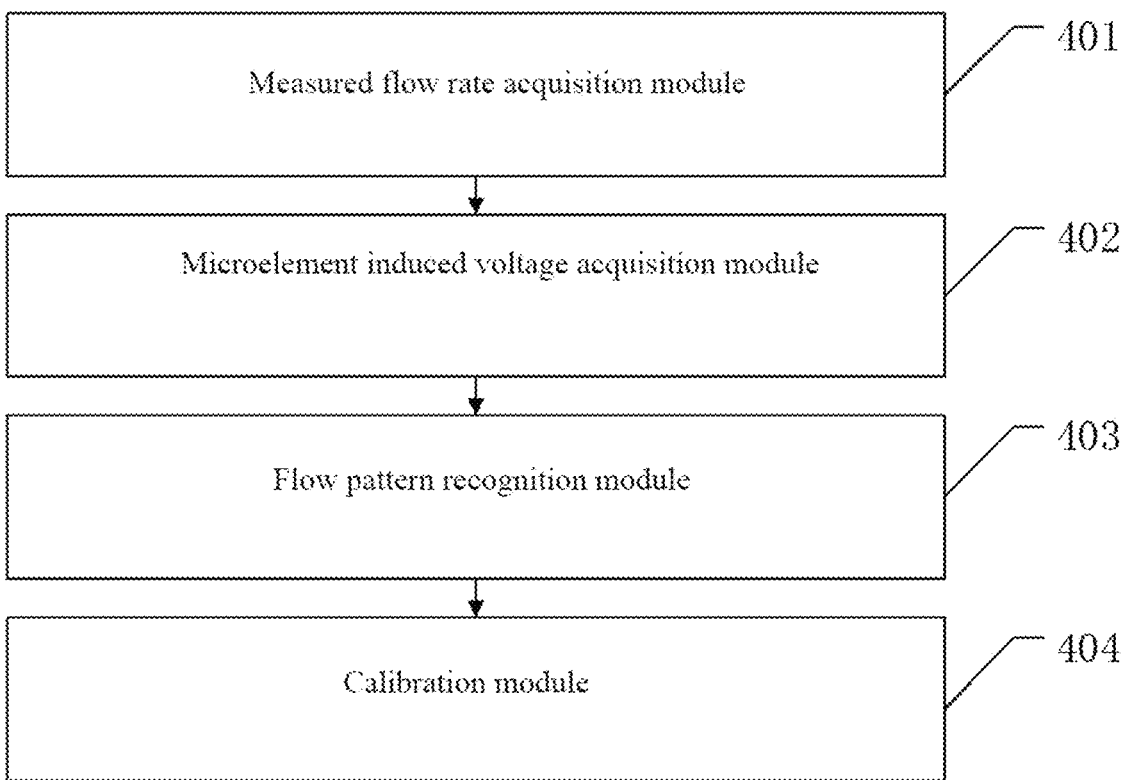
FIG. 4 is a schematic structural diagram of an electromagnetic flowmeter calibration device provided by an example of the present disclosure.

FIG. 4 is a structural diagram of an electromagnetic flowmeter calibration device provided by an example of the present disclosure, which is adapted to perform the calibration of the electromagnetic flowmeter provided by an example of the present disclosure. As shown in FIG. 4, the device may specifically include the following modules.

A measured flow rate acquisition module 401 is configured to measure, in a case that a fluid flows through a through-flow pipeline of an electromagnetic flowmeter, a flow rate of the fluid flowing through the through-flow pipeline using the electromagnetic flowmeter to obtain a measured flow rate. It can facilitate the calibration of meter parameters of the electromagnetic flowmeter according to the measured flow rate and a standard flow rate.

A microelement induced voltage acquisition module 402 is configured to measure induced voltages of various section microelements in a section microelement matrix of a cross section of the through-flow pipeline using an electrode array arranged around the cross section of the through-flow pipeline to obtain a plurality of microelement induced voltages, the section microelement matrix of the cross section of the through-flow pipeline being composed of a plurality of section microelements obtained by dividing the cross section of the through-flow pipeline. It can facilitate the feature extraction of the induced voltages of the various section microelements, and the recognition of a flow pattern of the fluid by using a fluid flow pattern recognition model.

The electrode array penetrates through a pipeline wall corresponding to the cross section of the through-flow pipeline.

A flow pattern recognition module 403 is configured to perform feature extraction on the plurality of microelement induced voltages to obtain an input feature of a fluid flow pattern recognition model, and recognize a flow pattern of the fluid using the fluid flow pattern recognition model according to the input feature. It can facilitate the calculation of the standard flow rate of the fluid according to the flow pattern of the fluid, and further facilitate the accurate calibration of the meter parameters of the electromagnetic flowmeter according to the standard flow rate and the measured flow rate measured by the electromagnetic flowmeter.

The flow pattern recognition module can be specifically used for generating a distribution map of a flow field to be recognized according to the plurality of microelement induced voltages as an input feature of the fluid flow pattern recognition model.

A calibration module 404 is configured to calculate a flow rate of the fluid flowing through the through-flow pipeline according to the flow pattern of the fluid to obtain a standard flow rate, and calibrate a meter coefficient of the electromagnetic flowmeter according to the standard flow rate and the measured flow rate. It can accurately calculate a flow rate of a fluid flowing through the electromagnetic flowmeter according to the flow pattern and further calibrate the meter coefficient of the electromagnetic flowmeter according to the standard flow rate on the basis of accurately recognizing a flow pattern of the fluid flowing through the electromagnetic flowmeter using the fluid flow pattern recognition model in combination with modules 401-403, thereby accurately calibrating the electromagnetic flowmeter with low cost and high efficiency without disassembling the electromagnetic flowmeter.

The electromagnetic flowmeter calibration device further includes a temperature measurement module for measuring a temperature of the fluid to obtain a fluid temperature.

The calibration module 404 can be specifically configured to calibrate the meter coefficient of the electromagnetic flowmeter according to the standard flow rate, the measured flow rate, and the fluid temperature.

The electromagnetic flowmeter calibration device further includes a microelement magnetic induction intensity acquisition module configured to obtain a normal magnetic flux density of the cross section of the through-flow pipeline by using an electromagnetic induction array arranged around the cross section of the through-flow pipeline to measure, and obtain magnetic induction intensities of the various section microelements by using the normal magnetic flux density to reconstruct a magnetic field in the through-flow pipeline.

The calibration module 404 can also be specifically configured to determine weight functions of the various section microelements according to the flow pattern of the fluid, calculate a flow velocity of the fluid flowing through the cross section of the through-flow pipeline according to the weight functions of the various section microelements, the magnetic induction intensities of the various section microelements and the induced voltages of the various section microelements, and calculate a standard flow rate according to the flow velocity of the fluid.

The electromagnetic flowmeter calibration device further includes a fluid flow pattern recognition model training module configured to acquire a plurality of distribution maps of sample flow fields corresponding to typical flow fields of different multiphase flows, take the distribution maps of the sample flow fields as a training input of a fluid flow pattern recognition model to be trained, guide a training output of the fluid flow pattern recognition model to be trained with corresponding typical flow field labels of the multiphase flows, and train the fluid flow pattern recognition model to be trained to obtain the fluid flow pattern recognition model.

The electromagnetic flowmeter calibration device further includes a human-computer interaction module configured to acquire a calibration command input by a calibration person and display relevant information about the calibration of the meter coefficient.

The human-computer interaction module may include a liquid crystal display screen and user buttons.

The relevant information about the calibration includes fluid flow pattern information, magnetic field information, temperature information, measured flow rate information, standard flow rate information and final calibrated meter coefficient.

The electromagnetic flowmeter calibration device further includes a communication module configured to send the relevant information about the calibration of the meter coefficient to a lower computer.

The communication module may include an infrared communication module, an MBUS communication module and an RS485 communication module. Infrared communication is to meet the requirements of manual wireless reading, and MBUS communication and RS485 may achieve remote reading.

Example 5

Figure 5:
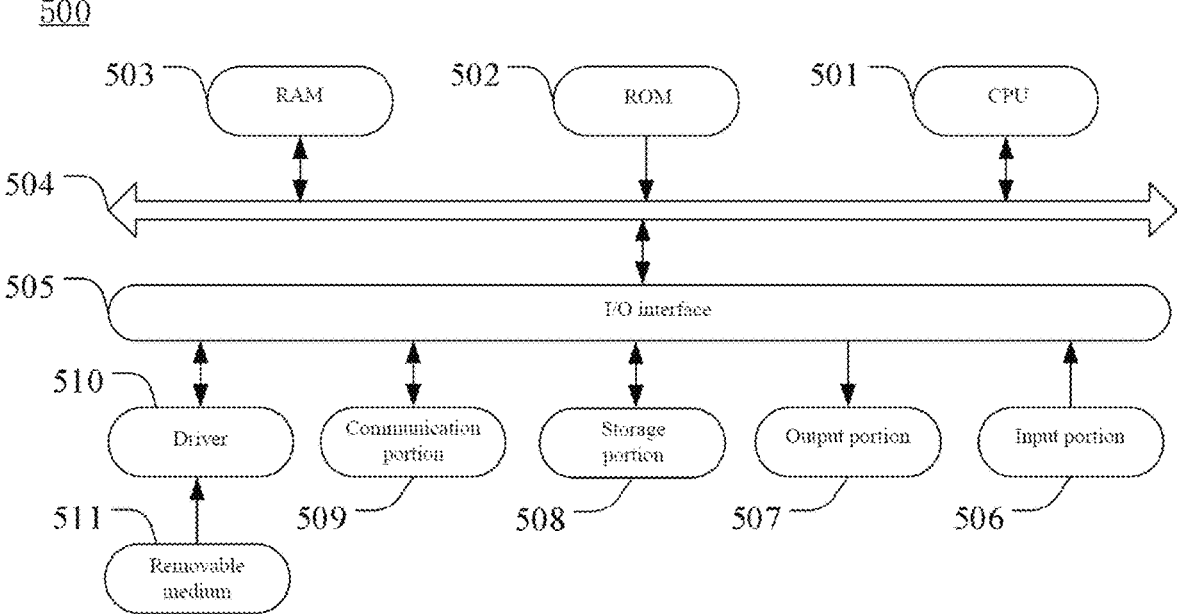
FIG. 5 is a schematic structural diagram of electronic equipment provided by an example of the present disclosure.

Reference is now made to FIG. 5, which illustrates a schematic structural diagram of a computer system 500 suitable for implementing electronic equipment of an example of the present disclosure.

As shown in FIG. 5, the computer system 500 includes a central processing unit (CPU) 501, which may perform various appropriate actions and processes according to a program stored in a read-only memory (ROM) 502 or a program loaded from a storage portion 508 into a random access memory (RAM) 503. In the RAM 503, various programs and data required for the operation of the system 500 are also stored. The CPU 501, the ROM 502 and the RAM 503 are connected to each other via a bus 504. An input/output (I/O) interface 505 is also connected to the bus 504.

The following components are connected to the I/O interface 505: an input portion 506 including a keyboard, a mouse, etc.; an output portion 507 such as a cathode ray tube (CRT), a liquid crystal display (LCD) and a speaker, etc.; a storage portion 508 including a hard disk, etc.; and a communication portion 509 including a network interface card such as a local area network (LAN) card, a modem, etc. The communication portion 509 performs communication processing via a network such as the Internet. A driver 510 is also connected to the I/O interface 505 as required. A removable medium 511, such as a magnetic disk, optical disk, magneto-optical disk, semiconductor memory or the like, is mounted on the driver 510 as required so that a computer program read therefrom is mounted into the storage portion 508 as required.

In a case that the fluid flows through the through-flow pipeline of the electromagnetic flowmeter, the flow rate of the fluid flowing through the through-flow pipeline is measured using the electromagnetic flowmeter to obtain the measured flow rate. The induced voltages of the various section microelements in the section microelement matrix of the cross section of the through-flow pipeline are measured using the electrode array arranged around the cross section of the through-flow pipeline to obtain the plurality of microelement induced voltages. The section microelement matrix of the cross section of the through-flow pipeline is composed of the plurality of the section microelements obtained by dividing the cross section of the through-flow pipeline. Feature extraction is performed on the plurality of microelement induced voltages to obtain the input feature of the fluid flow pattern recognition model, and the flow pattern of the fluid is recognized using the fluid flow pattern recognition model according to the input feature. The flow rate of the fluid flowing through the through-flow pipeline is calculated according to the flow pattern of the fluid to obtain the standard flow rate, and the meter coefficient of the electromagnetic flowmeter is calibrated according to the standard flow rate and the measured flow rate.

The invention claimed is:

1. An electromagnetic flowmeter calibration method, comprising:

measuring, in a case that a fluid flows through a through-flow pipeline of an electromagnetic flowmeter, a flow rate of the fluid flowing through the through-flow pipeline using the electromagnetic flowmeter to obtain a measured flow rate;

measuring induced voltages of various section microelements in a section microelement matrix of a cross section of the through-flow pipeline using an electrode array arranged around the cross section of the through-flow pipeline to obtain a plurality of microelement induced voltages, the section microelement matrix of the cross section of the through-flow pipeline comprising a plurality of section microelements obtained by dividing the cross section of the through-flow pipeline;

performing feature extraction on the plurality of microelement induced voltages to obtain an input feature of a fluid flow pattern recognition model, and recognizing a flow pattern of the fluid using the fluid flow pattern recognition model according to the input feature; and calculating a flow rate of the fluid flowing through the through-flow pipeline according to the flow pattern of the fluid to obtain a standard flow rate, and calibrating a meter coefficient of the electromagnetic flowmeter according to the standard flow rate and the measured flow rate.

2. The electromagnetic flowmeter calibration method according to claim 1, wherein:

the electrode array penetrates through a pipeline wall corresponding to the cross section of the through-flow pipeline.

3. The electromagnetic flowmeter calibration method according to claim 1, wherein:

the performing feature extraction on the plurality of microelement induced voltages to obtain an input feature of a fluid flow pattern recognition model comprises:

generating a distribution map of a flow field to be recognized according to the plurality of microelement induced voltages as an input feature of the fluid flow pattern recognition model.

4. The electromagnetic flowmeter calibration method according to claim 1, wherein:

a magnetically sensitive tracking indicator is added to the fluid; and before the calculating a flow rate of the fluid flowing through the through-flow pipeline according to the flow pattern of the fluid to obtain a standard flow rate, a normal magnetic flux density of the cross section of the through-flow pipeline is measured using an electromagnetic induction array arranged around the cross section of the through-flow pipeline, and a magnetic field in the through-flow pipeline is reconstructed using the normal magnetic flux density to obtain magnetic induction intensities of the various section microelements, the calculating a flow rate of the fluid flowing through the through-flow pipeline according to the flow pattern of the fluid to obtain a standard flow rate comprising:

determining weight functions of the various section microelements according to the flow pattern of the fluid, and calculating a flow velocity of the fluid flowing through the cross section of the through-flow pipeline according to the weight functions of the various section microelements, the magnetic induction intensities of the various section microelements and the induced voltages of the various section microelements, and calculating the standard flow rate according to the flow velocity of the fluid.

5. The electromagnetic flowmeter calibration method according to claim 4, wherein:

the electromagnetic induction array comprises a plurality of Hall probes uniformly arranged on an inner wall of a pipeline corresponding to the cross section of the through-flow pipeline.

6. The electromagnetic flowmeter calibration method according to claim 1, wherein:

before the calibrating a meter coefficient of the electromagnetic flowmeter according to the standard flow rate and the measured flow rate, a temperature of the fluid is measured to obtain a fluid temperature, the calibrating a meter coefficient of the electromagnetic flowmeter according to the standard flow rate and the measured flow rate comprising:

calibrating the meter coefficient of the electromagnetic flowmeter according to the standard flow rate, the measured flow rate and the fluid temperature.

7. The electromagnetic flowmeter calibration method according to claim 6, wherein:

a heating device is arranged outside the electrode array, and the temperature of the fluid is 20-30° C.

8. The electromagnetic flowmeter calibration method according to claim 1, wherein:

the fluid flow pattern recognition model is trained by:

acquiring a plurality of distribution maps of sample flow fields corresponding to typical flow fields of different multiphase flows; and taking the distribution maps of the sample flow fields as a training input of a fluid flow pattern recognition model to be trained, guiding a training output of the fluid flow pattern recognition model to be trained with corresponding typical flow field labels of the multiphase flows, and training the fluid flow pattern recognition model to be trained to obtain the fluid flow pattern recognition model.

9. An electromagnetic flowmeter calibration device, comprising:

a measured flow rate acquisition module, configured to measure, in a case that a fluid flows through a through-flow pipeline of an electromagnetic flowmeter, a flow rate of the fluid flowing through the through-flow pipeline using the electromagnetic flowmeter to obtain a measured flow rate;

a microelement induced voltage acquisition module, configured to measure induced voltages of various section microelements in a section microelement matrix of a cross section of the through-flow pipeline using an electrode array arranged around the cross section of the through-flow pipeline to obtain a plurality of microelement induced voltages, the section microelement matrix of the cross section of the through-flow pipeline comprising a plurality of section microelements obtained by dividing the cross section of the through-flow pipeline;

a flow pattern recognition module, configured to perform feature extraction on the plurality of microelement induced voltages to obtain an input feature of a fluid flow pattern recognition model, and recognize a flow pattern of the fluid using the fluid flow pattern recognition model according to the input feature; and a calibration module, configured to calculate a flow rate of the fluid flowing through the through-flow pipeline according to the flow pattern of the fluid to obtain a standard flow rate, and calibrate a meter coefficient of the electromagnetic flowmeter according to the standard flow rate and the measured flow rate.

10. The electromagnetic flowmeter calibration device according to claim 9, wherein:

the measured flow rate acquisition module comprises an electrode array, a heating device being arranged around the electrode array.

* * * * *